United States Patent
Okamoto et al.

(10) Patent No.: US 6,668,280 B1
(45) Date of Patent: Dec. 23, 2003

(54) SYSTEM CONFIGURATION SETTING METHOD AND TRANSMISSION APPARATUS

(75) Inventors: Tamaki Okamoto, Yokohama (JP); Hiroshi Kanzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/243,352

(22) Filed: Feb. 1, 1999

(30) Foreign Application Priority Data

May 8, 1998 (JP) .......................................... 10-126484

(51) Int. Cl.[7] ..................... G06F 15/177; G06F 15/173
(52) U.S. Cl. .................... 709/220; 709/221; 709/223
(58) Field of Search .............................. 709/221, 226, 709/223, 244, 229, 220; 703/21, 22; 370/398, 395.2, 422, 477, 229, 230, 230.1, 254, 545

(56) References Cited

U.S. PATENT DOCUMENTS 5,696,761 A * 12/1997 Kos et al. ................... 370/386
6,047,113 A *  4/2000 Olnowich ................... 709/221
6,085,238 A *  7/2000 Yuasa et al. ................ 709/223
6,205,158 B1 *  3/2001 Martin et al. ............... 370/541

* cited by examiner

Primary Examiner—W. Thomson
(74) Attorney, Agent, or Firm—Katten Muchin Zavis Rosenman (57) ABSTRACT

The invention concerns a system configuration setting method and a transmission apparatus, and simplifies system reconfiguration operations. The transmission apparatus comprises an HMI control block 1, a main control block 2, a line connection block 3, high-speed units 4 and 5, low-speed units 6 to 8, and a power supply unit 9, wherein the high-speed and low-speed units are managed by the main control block 2, whose management information is also stored in the HMI control block 1. A system reconfiguration command associated with a unit insertion, removal, etc. is entered into the transmission apparatus from a terminal 10. In the HMI control block 1, a configuration setting judging section refers to the management information in accordance with the command, and determines whether reconfiguration is needed or not; if it is determined that the reconfiguration is needed, the configuration setting judging section sends to the main control block 2 a control request containing updated management information associated with the system reconfiguration, whereupon the main control block 2 effects the system reconfiguration to manage and control the respective units.

7 Claims, 10 Drawing Sheets

| MAIN SIGNAL UNITS | UNIT INSTALLATION STATE TABLE | UNIT TYPE TABLE | SERVICE STATE TABLE |
|---|---|---|---|
| HIGH-SPEED 1-W | PROPERLY INSTALLED | OC3 | IS |
| HIGH-SPEED 1-P | NOT INSTALLED | NOT INSTALLED | OOS |
| HIGH-SPEED 2-W | NOT INSTALLED | NOT INSTALLED | OOS |
| HIGH-SPEED 2-P | IMPROPERLY INSTALLED | OC12 | OOS |
| LOW-SPEED 1-W | IMPROPERLY INSTALLED | D3 | OOS |
| LOW-SPEED 1-P | PROPERLY INSTALLED | EC1 | IS |
| LOW-SPEED 2-W | ---------- | ---------- | ---------- |
| LOW-SPEED 2-P | | | |

SYSTEM CONFIGURATION SETTING METHOD AND TRANSMISSION APPARATUS

BACKGROUND OF THE INVENTION

1. Field of the Invention

The present invention relates to a system configuration setting method for automatically setting system configuration, and also relates to a transmission apparatus.

Various kinds of transmission apparatuses are usually constructed using multiple units of multiple kinds, and for system expansion, functionality upgrading, etc., units are added or replaced, and the system is reconfigured accordingly. It is therefore desired to simplify operations for such system reconfigurations.

2. Description of the Related Art

Figure 10:
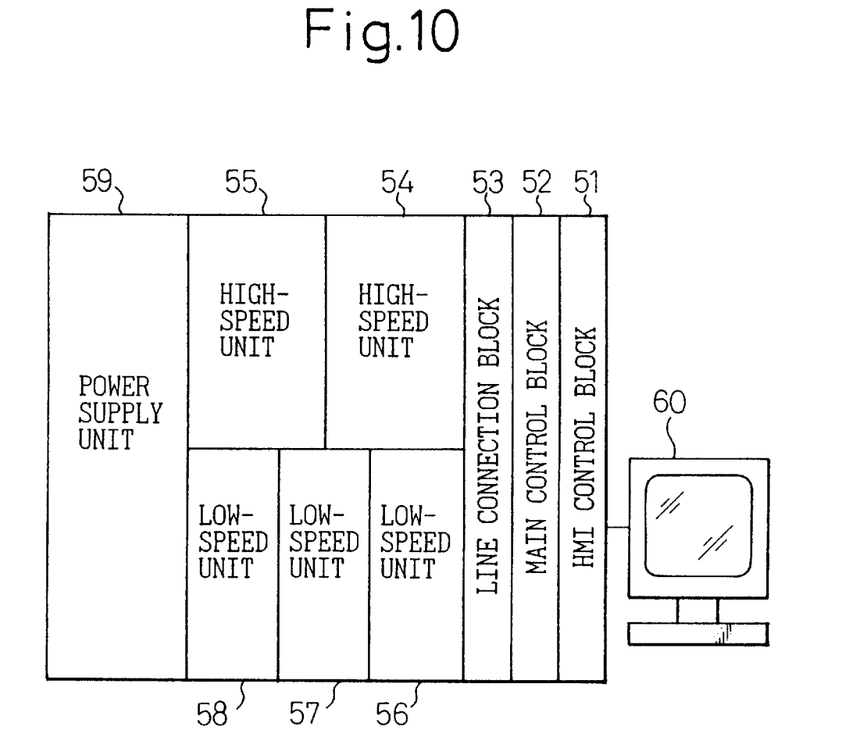
FIG. 10 is a diagram for explaining the essential elements of a transmission apparatus.

FIG. 10 is a diagram for explaining the essential elements of a transmission apparatus, wherein reference numeral 51 is a human-machine interface (HMI) control block, 52 is a main control block, 53 is a line connection block, 54 and 55 are high-speed units, 56 to 58 are low-speed units, 59 is a power supply unit, and 60 is a terminal.

In the illustrated configuration, the high-speed units 54 and 55 and low-speed units 56 to 58 constitute main signal units which are controlled by the main control block 52. The high-speed units are capable of a transmission speed, for example, of 600 Mbps, and the low-speed units are capable of a transmission speed, for example, of 50 Mbps. Each main signal unit includes an interface section, having, for example, an electrical-to-optical conversion function, for communication with other transmission apparatuses and switching equipment.

When a command is entered from the terminal 60, the HMI control block 51 analyzes the command and sends a control request to the main control block 52. The main control block 52 contains a management table (not shown) for managing the type, version, installation state, etc. of the main signal units, etc. described above, and is responsible for the management of the system configuration. The line connection block 53 has the function of controlling connections between the main signal units or with external lines. The power supply unit 59 includes a regulated power supply for supplying a stable operating voltage to each element.

Generally, a dual configuration consisting of a working unit and a protection unit for enhanced reliability is employed for each functional unit. In that case, the main control block 52, which manages the state of each functional unit, switches the operation to the protection unit in the event of a failure of the working unit. When installing an additional unit for system expansion or replacing a unit for functionality upgrading, requiring reconfiguration of the system, the operator enters commands in sequence from the terminal 60 for the reconfiguration of the system.

Upon receiving each command from the terminal 60, the HMI control block 51 analyses the command and sends a control request based on the result of the analysis to the main control block 52. In response to the control request, the main control block 52 refers to the management table and carries out the reconfiguration of the system.

As the system configuration changes, for example, as the result of installing an additional unit for system expansion, etc. or replacing an old functional unit with a new functional unit for functionality upgrading, it becomes necessary to update the management table in the main control block 52 and to make settings, etc. for the newly installed unit. In that case, the operator must enter commands from the terminal 60, as described above, to perform a sequence of procedures to switch the lines and units currently in service to an out-of-service state and, after the new unit has been installed, a sequence of procedures to switch them back to the in-service state.

Thus the operator has to enter commands in sequence in accordance with the procedures by using his knowledge, if he is familiar with the functions of each unit, or by referring to the operation manual; this presents a problem in that the operations required to carry out the procedures are complex. Furthermore, with increasing functionality of transmission apparatus, the units mounted therein increase both in kind and in number, further increasing the complexity of operations for system reconfiguration and lengthening the time required from the initiation of the reconfiguration process to the restarting of the system. The complexity in operation has had the further problem in that the possibility of operational errors increases.

SUMMARY OF THE INVENTION

It is, accordingly, an object of the present invention to simplify system reconfiguration operations.

The invention provides (1) a system configuration setting method for a transmission apparatus that includes, as will be shown in FIG. 1 later, a main control block 2 which sets system configuration by managing multiple units of multiple kinds and an HMI control block 1 which receives a command from an external terminal 10 and makes a control request to the main control block 2, the method comprising a step where, in response to a system reconfiguration command from the terminal 10, the HMI control block 1 determines, based on management information managed therein, whether system reconfiguration is needed or not, and if it is determined that the reconfiguration is needed, the HMI control block 1 sends a control request to the main control block 2 to change the system configuration so as to match an installed unit, whereupon the system reconfiguration is effected by the main control block 2. Accordingly, by just entering information concerning the addition or removal of a unit and its associated system reconfiguration command only once at the beginning, the main control block 2 can be activated to effect the system reconfiguration.

According to the invention (2), the system configuration setting method includes a step where, when the system reconfiguration command is entered from the terminal 10, the HMI control block 1 judges the installation state of the unit based on the management information, to determine whether the unit is not installed, properly installed, or improperly installed and, based on the result of the judgement of the installation state, determines whether the system reconfiguration is needed or not, and if it is determined that the reconfiguration is needed, the HMI control block 1 sends the control request to the main control block 2, whereupon the system reconfiguration is effected by the main control block 2.

According to the invention (3), the system configuration setting method includes a step where when the system reconfiguration command is entered from the terminal 10, the HMI control block 1 judges the unit type of the installed unit based on the management information, to determine whether the unit type is the same between a working unit and a protection unit and, only when the unit type is the same, the HMI control block 1 determines that the system reconfiguration is needed, and sends the control request to the main control block 2 to change the system configuration so as to match the installed unit, whereupon the system reconfiguration is effected by the main control block. That is, if the unit type differs between the working unit and protection unit, the dual function will not work; therefore, in that case, the previous state is retained.

According to the invention (4), the system configuration setting method includes a step where when the system reconfiguration command is entered from the terminal 10, the HMI control block 1 judges the versions of a working unit and a protection unit based on the management information, and performs control so that when one version is new and the other is old, the system reconfiguration is effected according to the old version, and when both of the versions are either new or old and identical in version number, the system reconfiguration is effected according to either the new version or the old version. That is, if the version is different between the working and protection units, the state according to the old version is retained, and the version is not switched to the new version.

According to the invention (5), the system configuration setting method includes a step where, when the system reconfiguration command is entered from the terminal 10, the HMI control block 1 judges the installation state of the unit based on the management information, and determines, based on the installation state, whether the reconfiguration is needed or not, and if it is determined that the reconfiguration is needed, the HMI control block 1 performs control so that the system reconfiguration is effected to set the unit to a serviceable state if the unit is properly installed or to an out-of-service state if the unit is not properly installed. That is, if the unit is not properly installed, the unit is automatically set to the out-of-service state so that the unit will not be put into the in-service state.

The invention also provides a transmission apparatus comprising a main control block 2 for accommodating and managing multiple units of multiple kinds and an HMI control block 1, connected to an external terminal 10, for transferring information to and from the main control block 2, wherein the HMI control block 1 includes a management table constructed based on management information from the main control block 2, a management section which manages unit and line states, and a configuration setting judging section which, when activated by a system reconfiguration command from the terminal 10, refers to the management table and determines whether system reconfiguration is needed or not and, if it is determined that the reconfiguration is needed, sends a control request to the main control block to change the system configuration so as to match an installed unit.

According to the invention (7), the HMI control block 1 comprises: a unit installation state management section which manages unit installation states; a unit type management section which manages unit types; a unit version management section which manages unit versions; a unit service state management section which manages unit service states such as an in-service state; a line service state management section which manages line service states; a line connection state management section which manages line speeds and the like; a management table which stores management information managed by the respective management sections; and a configuration setting judging section which, in response to a system reconfiguration command from the terminal 10, refers to the management table and determines whether system reconfiguration is needed or not and, if it is determined that the reconfiguration is needed, sends a control request to the main control block 2 to change the system configuration so as to match the installed unit.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
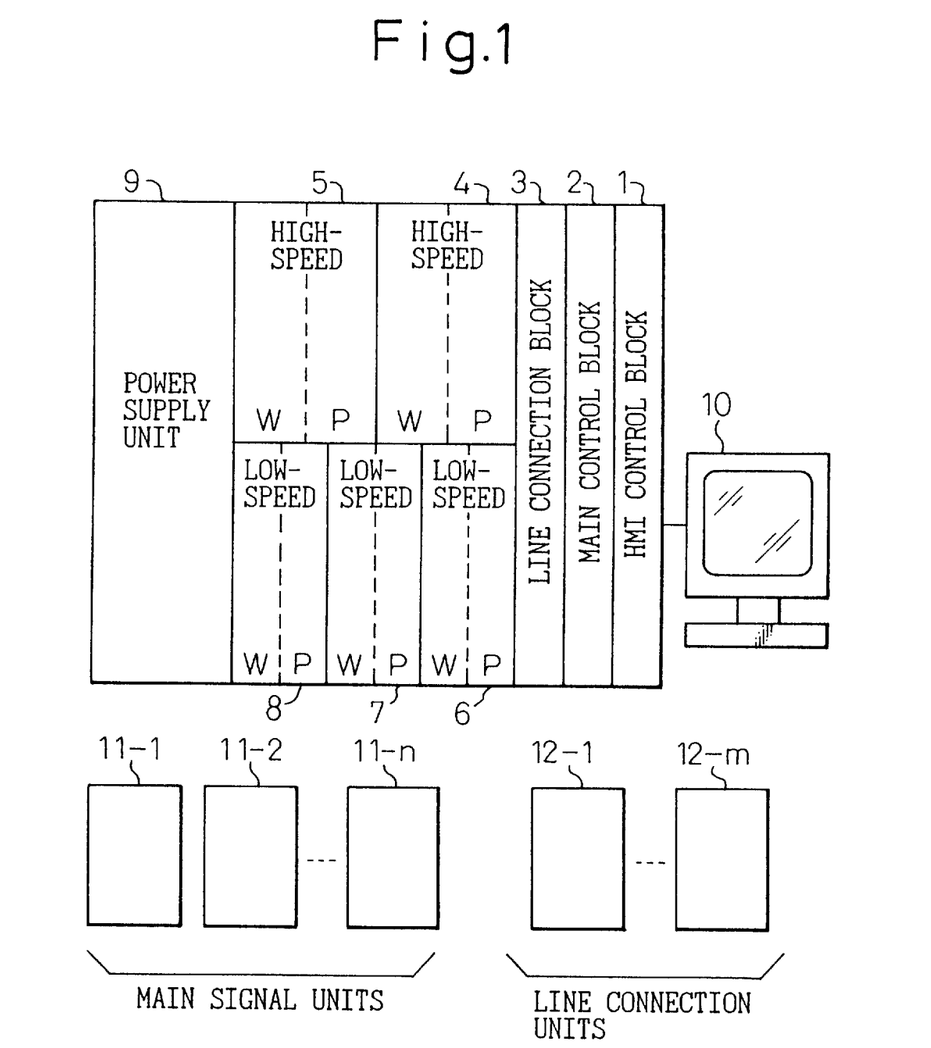
FIG. 1 is a diagram for explaining an embodiment of the present invention.

FIG. 1 is a diagram for explaining an embodiment of the present invention, wherein reference numeral 1 is a human-machine interface (HMI) control block, 2 is a main control block, 3 is a line connection block, 4 and 5 are high-speed units, 6, 7, and 8 are low-speed units, 9 is a power supply unit, and 10 is a terminal. Reference character W indicates a working unit, and P a protection unit. The high-speed units 4 and 5 and low-speed units 6 to 8 constitute main signal units. Reference numerals 11-1 to 11-n at the bottom of the figure denote various main signal units before installation, and 12-1 to 12-n designate line connection units, for example, of different versions, before installation. The line connection block 3 can also be constructed in a working/protection dual configuration, though not explicitly shown here.

When expanding the system configuration or upgrading the functionality of the system, an appropriate main signal unit will be installed by selecting it from among the main signal units 11-1 to 11-n. Further, to operate the line connection block 3 on the desired version, the unit of the designated version will be installed by selecting it from among the line connection units 12-1 to 12-n. In this way, when the system configuration is changed by adding a new unit or replacing or removing a unit, all that is needed is to enter a system reconfiguration command from the terminal 10; thereupon, the HMI control block 1 judges the command and sends a control request to the main control block 2, and the system reconfiguration is effected by the main control block 2.

Figure 2:
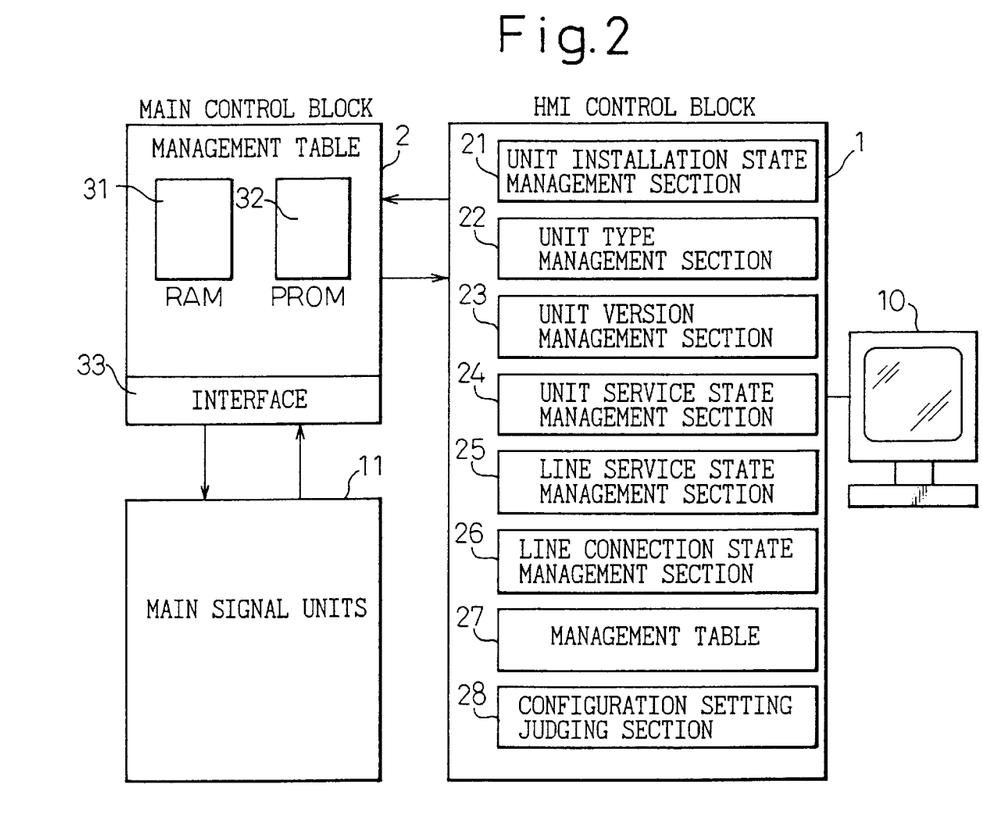
FIG. 2 is a diagram for explaining an HMI control block and a main control block in the embodiment of the present invention.

FIG. 2 is a diagram for explaining the HMI control block and main control block in the embodiment of the present invention. The same reference numerals as those in FIG. 1 designate the same constituent elements. The HMI control block 1 comprises a unit installation state management section 21, a unit type management section 22, a unit version management section 23, a unit service state management section 24, a line service state management section 25, a line connection state management section 26, a management table 27, and a configuration setting judging section 28.

The main control block 2 comprises a management table consisting of a random-access memory (RAM) 31 and a programmable read-only memory (PROM) 32 such as an EPROM or EEPROM, an interface section 33, and a unit installation information gathering facility. The main signal units 11 include the high-speed units 4 and 5 and the low-speed units 6 to 8 shown in FIG. 1.

The unit installation state management section 21 in the HMI control block 1 manages unit installation states, such as properly installed state, improperly installed state, and not-installed state. The unit type management section 22 manages unit types such as the transmission speed handled by each installed unit. The unit version management section 23 manages the version of each installed unit to identify, for example, whether the unit is of the old configuration or of the new configuration. The unit service state management section 24 and the line service state management section 25 manage the service state of each unit or line, such as whether the unit or line is in an in-service state or in an out-of-service state.

The line connection state management section 26 manages the transmission speed currently set for a cross-connect. The cross-connect, not shown here, cross-connects lines being served with the high-speed or low-speed units, operating, for example, at 50 Mbps or 1.5 Mbps, and implements path routing such as branching, insertion, and rerouting. The management table 27 contains tables for storing the information managed by the respective management sections.

The configuration setting judging section 28, in response to the system reconfiguration command entered from the terminal 10, refers to the management table 27 and sends a control request to the main control block 2 to automatically implement the processing for system reconfiguration. Accordingly, with the function of the configuration setting judging section 28, the reconfiguration process can be carried out without having to sequentially enter commands in accordance with procedures for system reconfiguration. The respective management sections and the configuration setting judging section 28 can also be implemented as functions of a processor. The management table 27 can be constructed with various kinds of memory devices such as a semiconductor integrated circuit memory.

The main control block 2 includes, in addition to the interface section 33 and the management table consisting of the random-access memory (RAM) 31 and programmable read-only memory (ROM) 32, a control facility for monitoring the installation state of each main signal unit 11 by periodically reading installation information, and for updating the management table as necessary. The main signal units 11 include the high-speed units 5 and 6 and the low-speed units 6 to 8 shown in FIG. 1.

Figure 3:
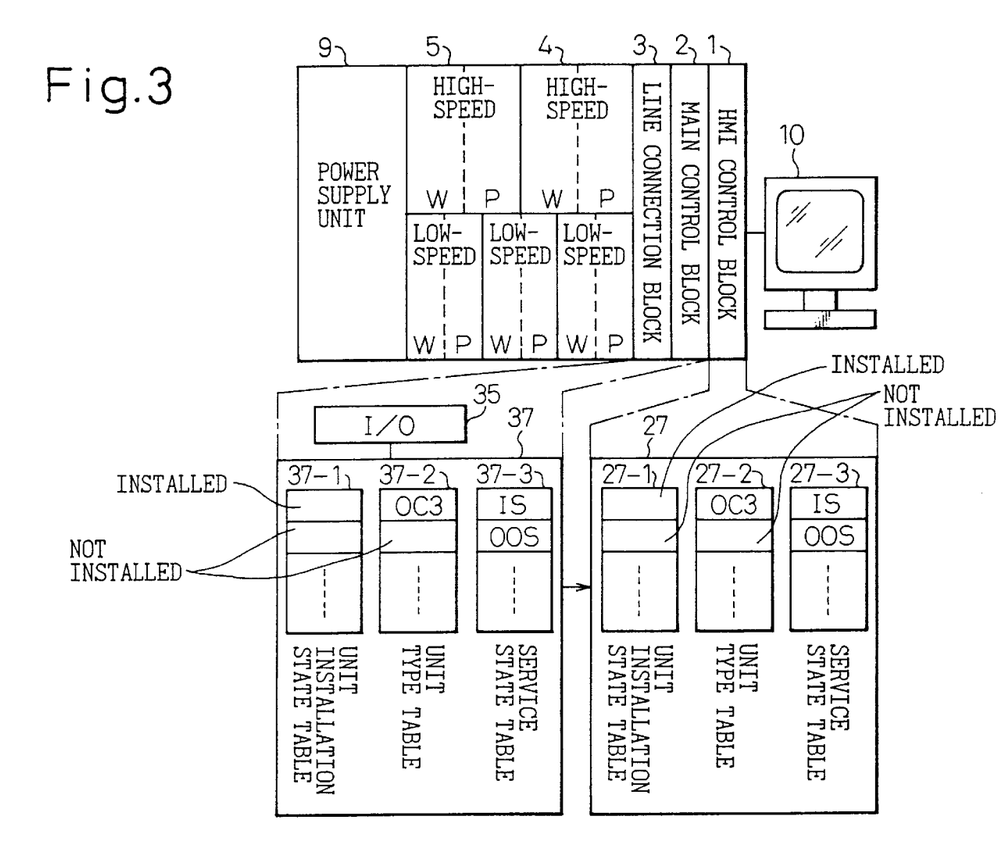
FIG. 3 is a diagram for explaining the configuration relating to a management table according to the embodiment of the present invention.

FIG. 3 is a diagram for explaining the configuration relating to the management table according to the embodiment of the present invention. The same reference numerals as those in FIG. 1 designate the same constituent elements. Reference numeral 35 indicates an input/output section (I/O), and 37 the management table that is constructed with the memories 31 and 32 shown in FIG. 2. Reference numeral 27 represents the management table in the HMI control block 1.

In the management tables 27 and 37, reference numerals 27-1 and 37-1 are unit installation state tables for managing unit installation states such as the properly installed state, improperly installed state, and not-installed state, 27-2 and 37-2 are unit type tables for managing unit types such as OC3, OC12, etc. (155 Mbps, 600 Mbps, etc. in SONET), and 27-3 and 37-3 are service state tables for managing the service state to identify the service state as an in-service state IS or an out-of-service state OOS.

The main control block 2 periodically monitors the installation state of each unit. Generally, the unit type information, etc. of each unit are held in a read-only memory or the like and made readable from the main control block 2. Thus, the main control block 2 updates the unit installation state table 37-1 by monitoring the installation state of each unit, and updates the unit type table 37-2 by using the unit type information, etc. read from each installed unit.

If the installation state, type information, etc. detected by monitoring the unit installation state, are different from the contents of the management table 37, the unit type information and version information are acquired via the input/output section 35 to update the unit installation table 37-1 and unit type table 37-2, and the results of the updating are transferred as update information to the HMI control block 1. The HMI control block 1 thus notified updates the management table 27.

The unit service state information, line service state information, and line connection state information can be updated by commands from the terminal 10. In this case, the information managed by the unit service state management section 24, line service state management section 25, or line connection state management section 26 in the HMI control block 1, whichever is designated by the entered command, is updated, and a control request corresponding to the command is sent to the main control block 2. The main control block 2 updates the management information in response to the control request. In this way, the information managed by the management table 37 in the main control block 2 is always brought into agreement with the information managed by the management table 27 in the HMI control block 1.

Figure 4:
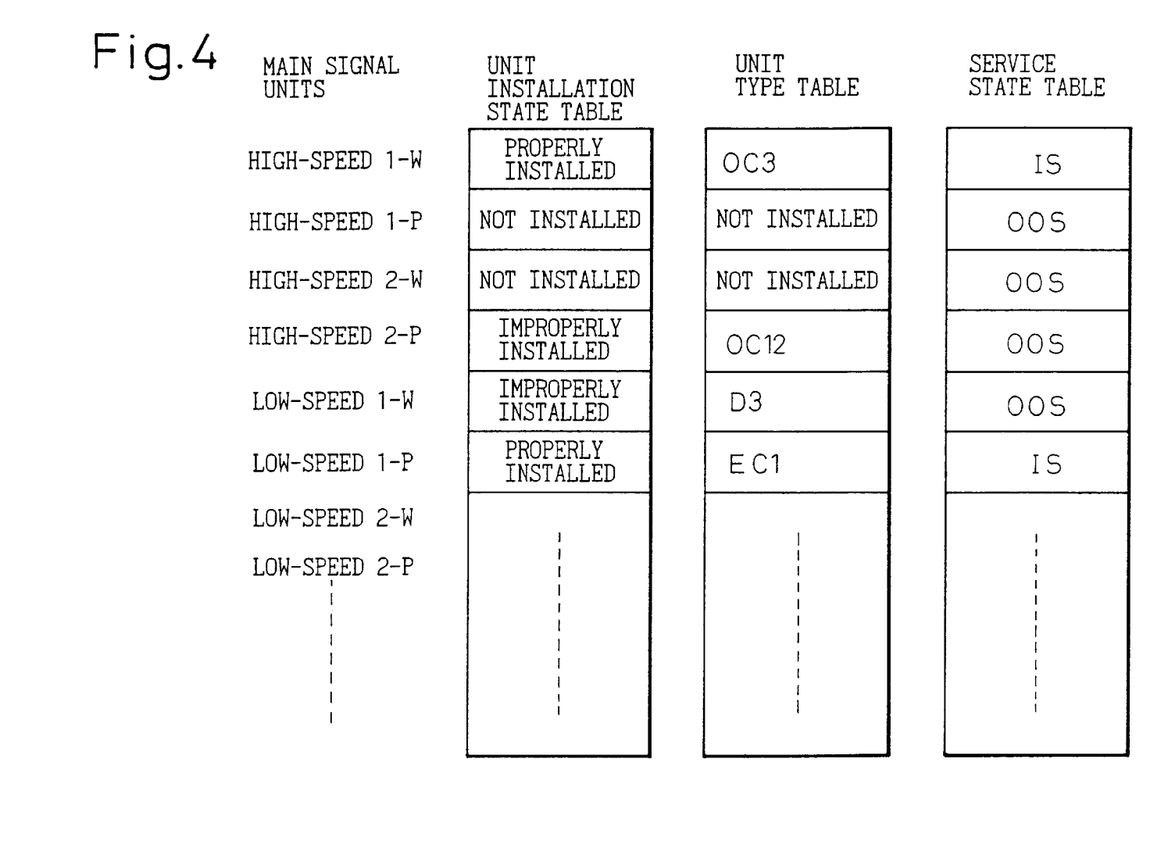
FIG. 4 is a diagram for explaining the management table.

FIG. 4 is a diagram for explaining the management tables. The diagram shows examples of entries in the unit installation state table, unit type table, and service state table in the management table 37 of the main control block 2 and the management table 27 of the HMI control block 1. As shown, the installation state information such as PROPERLY INSTALLED, the unit type information such as OC3, and the service state information such as IS indicating the in-service state, are stored at entries corresponding to each of the main signal high-speed unit 1-W (working side of the high-speed unit 4), high-speed unit 1-P (protection side of the high-speed unit 4), high-speed unit 2-W (working side of the high-speed unit 5), high-speed unit 2-P (protection side of the high-speed unit 5), low-speed unit 1-W (working side of the low-speed unit 6), low-speed unit 1-P (protection side of the low-speed unit 6), and so on.

The unit installation state table stores the installation state information indicating whether the unit is installed or not and, if installed, whether the unit is properly installed (for example, a high-speed unit is inserted in a high-speed slot) or improperly installed (for example, a high-speed unit is inserted in a low-speed slot). The unit type table stores the unit type information indicating OC3, OC12, etc., and the service state table stores the service state information such as the in-service state IS or out-of-service state OOS.

For example, the high-speed unit 1-W is properly installed, and its unit type information indicates OC3 and its service state information the in-service state IS, while the high-speed unit 1-P is not installed, and its unit type information indicates the not-installed state and its service state information the out-of-service state OOS. In the case of the high-speed unit 2-P, on the other hand, the unit is installed, but its unit type information indicates OC12, not OC3 of 150 Mbps for a high-speed unit, which means that the unit is improperly installed, and the service state information entry is therefore set to the out-of-service state OOS. Further, when the low-speed unit 1-P is properly installed and its unit type information indicates EC1, if the low-speed unit 1-W is installed and its unit type information indicates D3, then the unit type of the protection unit P is different from that of the working unit W; therefore, the low-speed unit 1-W is set to the improperly installed state and, hence, its service state information entry is set to the out-of-service state OOS.

Figure 5:
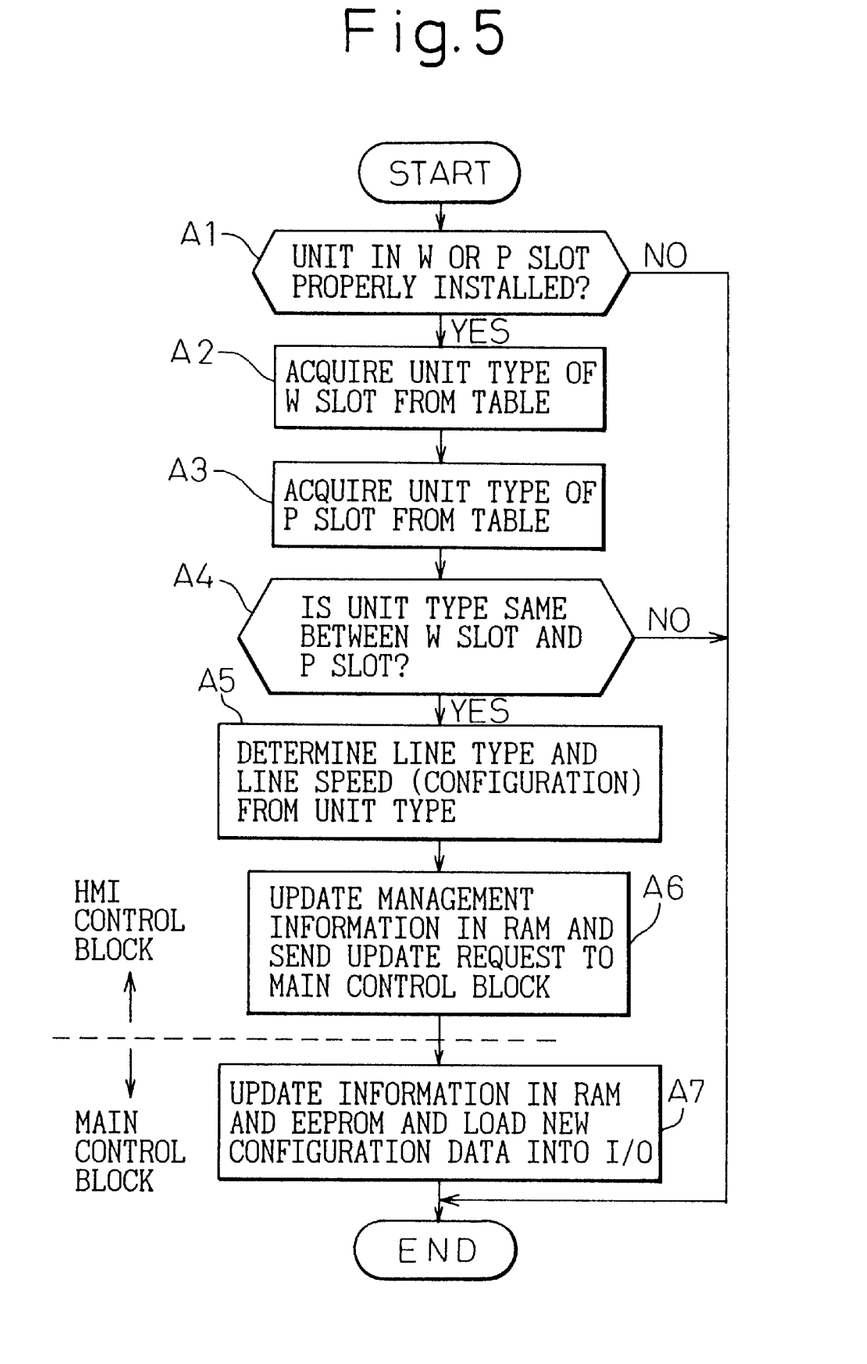
FIG. 5 is a flowchart according to a first embodiment of the present invention.

FIG. 5 is a flowchart according to a first embodiment of the present invention. When a unit is added or removed, a system reconfiguration command is entered from the terminal 10, in response to which the configuration setting judging section 28 (see FIG. 2) in the HMI control block 1 refers to the management table 27 and determines whether the unit inserted in the working W or protection P slot is properly installed or not (A1). That is, since control is performed so that the installation state information managed by the management table 37 in the main control block 2 agrees with the installation state information managed by the management table 27 in the HMI control block 1, the installation state of the unit can be determined by referring to the management table 27 in the HMI control block 1.

If the unit is not properly installed, that is, if the unit is not installed at all or improperly installed, the reconfiguration process is terminated. If the unit is properly installed, the unit type of the working W slot is read from the unit type table 27-2 managed by the unit type management section 22 (A2), and the unit type of the protection P slot is likewise read out (A3). Then, it is determined whether the unit type is the same between the working W slot and the protection P slot (A4).

For example, if an OC12 unit is inserted in a slot whose unit type is OC3, the unit type is different; therefore, the reconfiguration process is terminated to retain the previous state. If the unit type is the same, the line type and line speed corresponding to the unit type are determined (A5), and the management information in the management table (RAM) 27 is updated and an update control request is sent to the main control block 2 (A6).

In response to the control request, the management information in the management table (RAM, EEPROM) 37 is updated based on the management information from the HMI control block 1, and data for setting the system configuration redefined by the updated management information is loaded into the input/output section 35 (see FIG. 3) (A7). That is, when the system configuration is changed by installing a new unit, all that is needed is to enter the system reconfiguration command from the terminal 10; thereafter, the function of the configuration setting judging section 28 in the HMI control block 1 takes over, that is, the configuration setting judging section 28 refers to the management table 27 and instructs the main control block 2 to change the system configuration settings, thus reconfiguring the system to match the installed unit.

Figure 6:
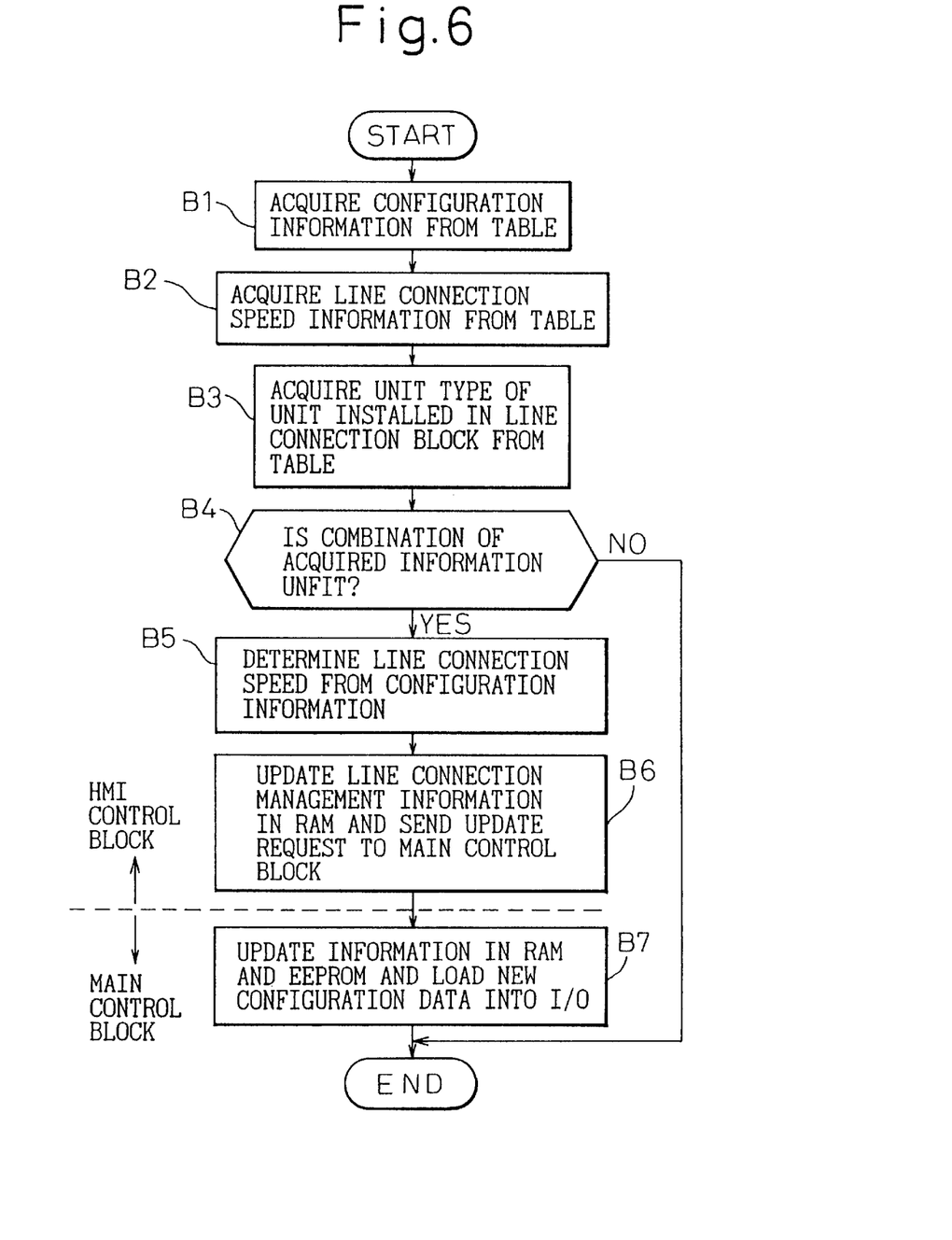
FIG. 6 is a flowchart according to a second embodiment of the present invention.

FIG. 6 is a flowchart according to a second embodiment of the present invention, showing the case where the transmission speed of the cross-connect is changed as the result of the insertion of a line connection unit. A system reconfiguration command containing the cross-connect speed change information is entered from the terminal 10. The configuration setting judging section 28 in the HMI control block 1 analyses the command and, based on the result of the analysis, acquires the system configuration information from the management table 27 (B1). Further, the line connection speed information managed by the line connection state management section 26 is read out from the management table 27 (B2), and the unit type managed by the unit type management section 22 is read out from the management table 27 (B3).

Then, it is determined whether the combination of the type and configuration currently set for the cross-connect and the unit type of the unit installed in the line connection section 3 is unfit or not (B4). If it is not unfit, there is no need to change the system configuration, so that the reconfiguration process is terminated. If the combination is unfit, the line connection speed is determined based on the configuration information, and the cross-connect speed appropriate to the line connection speed is determined (B5). With this determination, the management information for the line connection section 3 is updated, and a control request for changing the cross-connect speed setting is made to the main control block 2 (B6).

The main control block 2 updates the management information in the management table (RAM, EEPROM) 37 in accordance with the control request, containing updated management information, from the HMI control block 1, and loads the input/output section 35 (see FIG. 3) with the data for setting the system configuration redefined by the updated management information (B7). Control for the connection and switching between lines is now performed using the newly set cross-connect speed. In the above process, the line connection speed information is changed after switching the state from the in-service state to the out-of-service state, and then the state is switched from the out-of-service state back to the in-service state, but the steps for these operations are not shown here.

Figure 7:
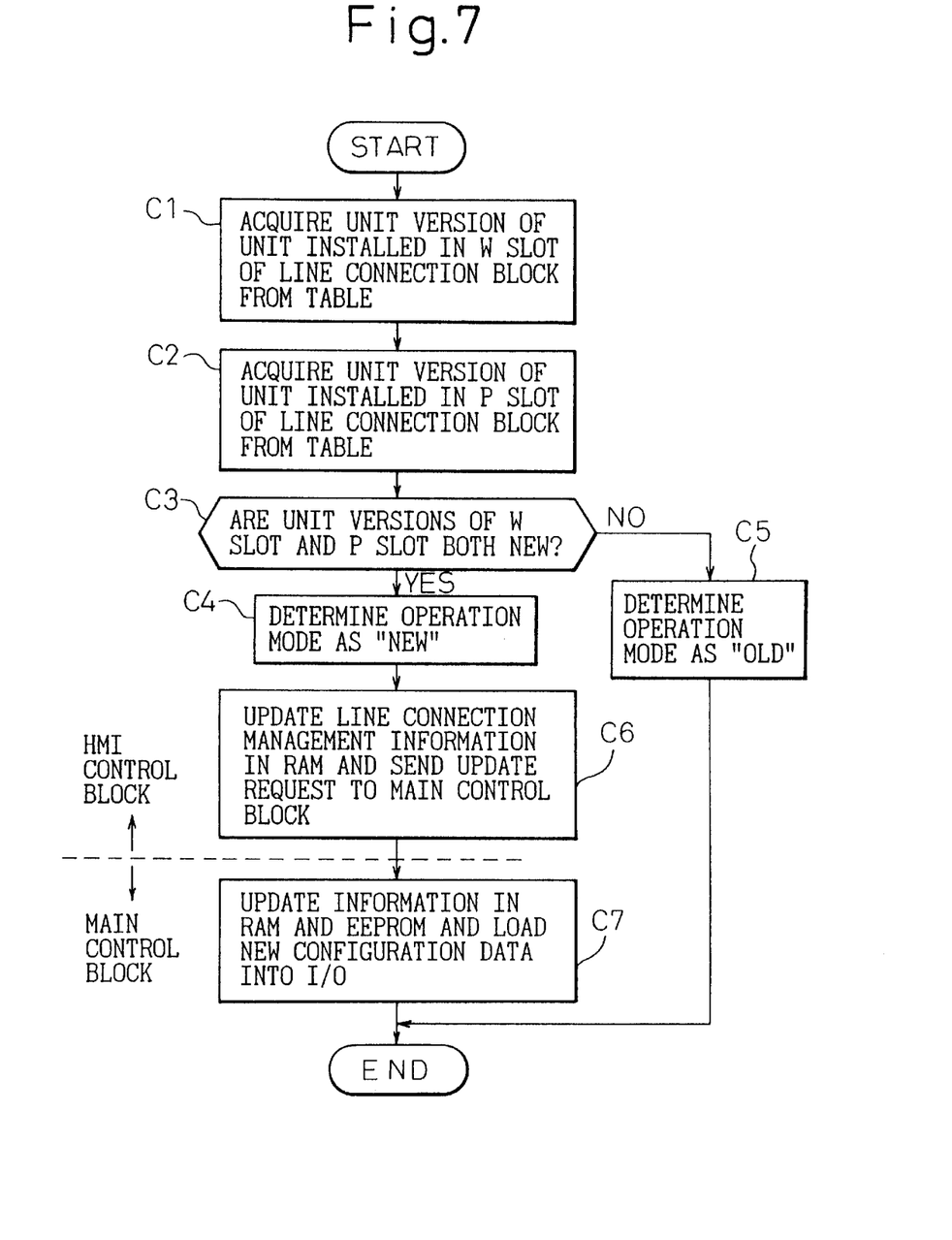
FIG. 7 is a flowchart according to a third embodiment of the present invention.

FIG. 7 is a flowchart according to a third embodiment of the present invention, showing the case where units of different versions are installed. For example, line connection units of new versions are inserted in the working W and protection P slots of the line connection section 3, and a system reconfiguration command associated with a version change is entered from the terminal 10. The configuration setting judging section 28 in the HMI control block 1 analyses the command, reads from the management table 27 the version information of the unit inserted in the working W slot of the line connection section 3 (C1) and the version information of the unit inserted in the protection P unit (C2), and determines whether both versions are new or not (C3).

If the version is different between the working and protection units, that is, if units of new and old versions are installed in a mixed manner, since it is usually difficult to switch from the new version back to the old version, the operation mode is determined to be that of the old version (C5). On the other hand, if both of the working and protection units are of the same new version, the operation mode is determined to be that of the new version (C4).

The line connection management information in the management table (RAM) 27, managed by the line connection state management section 26, is updated in accordance with the result of the determination (C4) or (C5), and a control request for system reconfiguration is made to the main control block 2 (C6). If the operation mode is determined to be that of the old version, and if the old version is the same as the previous version, the system reconfiguration associated with a version change is not necessary.

The main control block 2 updates the management information in the management table (RAM, EEPROM) 37 in accordance with the control request, containing the version information, issued from the HMI control block 1, and loads the input/output section 35 (see FIG. 3) with the data for setting the system configuration redefined by the updated management information (C7). With this data, the operation settings, etc. for the new version are made.

Figure 8:
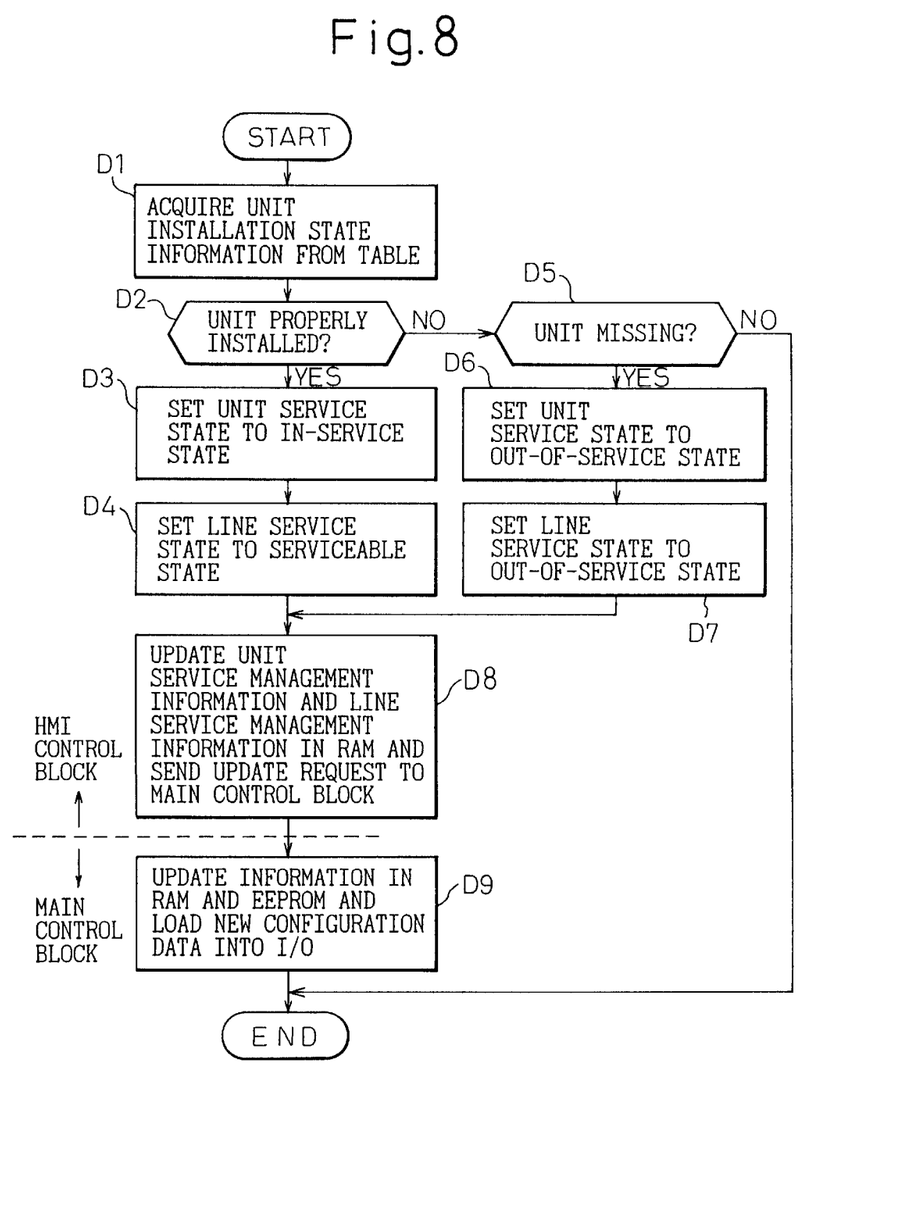
FIG. 8 is a flowchart according to a fourth embodiment of the present invention.

FIG. 8 is a flowchart according to a fourth embodiment of the present invention, showing the case of unit addition and removal. A new unit is inserted in a slot, and an old unit is removed, and a system reconfiguration command associated with unit addition/removal is entered from the terminal 10. The HMI control block 1 analyses the command, reads the unit installation state information from the unit installation state table 27-1 in the management table 27 (D1), and determines whether the unit is properly installed or not (D2).

If the answer is YES, the service state of that unit is set to the in-service state (D3). That is, the entry in the service state table 27-3 for that unit is set to the in-service state IS. Then, the line service state information in the management table, managed by the line service state management section 25, is set to the serviceable state (D4). At this time, in a process not shown, it is determined whether an alarm is issued or not, and if no alarm is reported, it is determined that the installed unit is operating normally, and the line service state is now set to the in-service state.

On the other hand, if the unit is not properly installed, it is determined whether the unit is missing or not (D5). If the unit is not properly installed, nor is it missing, the process is terminated because, in this case, the unit is improperly installed. If the unit is missing because the unit has been removed, the service state of that unit is set to the out-of-service state (D6), and the line-service state relating to that unit is also set to the out-of-service state (D7).

Then, the unit service state information managed by the unit service state information management section 24 and the line service state information managed by the line service state information management section 25 are updated and, based on the updated information, a control request for system reconfiguration is made to the main control block 2.

The main control block 2 updates the management information in the management table (RAM, EEPROM) 37 in accordance with the control request, containing the updated information, issued from the HMI control block 1, and loads the input/output section 35 (see FIG. 3) with the data for setting the system configuration redefined by the updated management information (D9). With this data, the system reconfiguration associated with unit addition/removal is performed.

Figure 9:
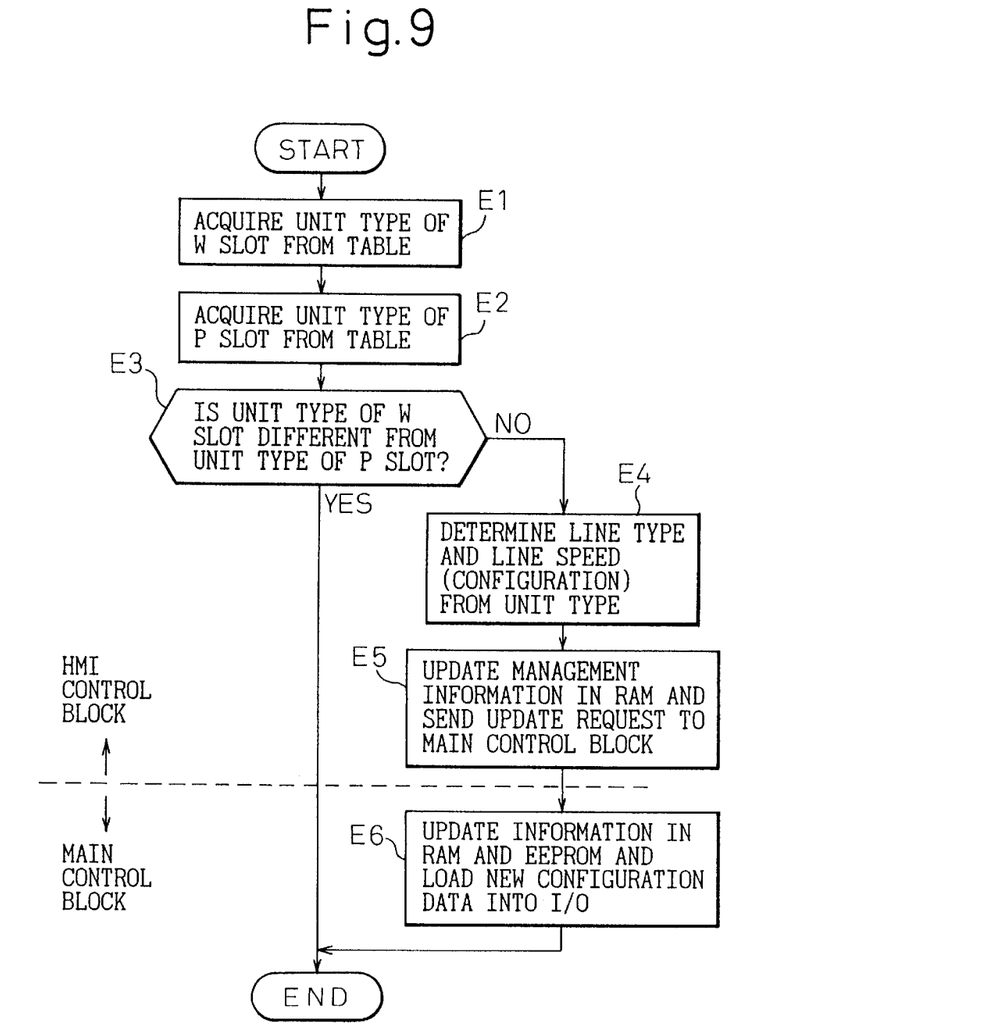
FIG. 9 is a flowchart according to a fifth embodiment of the present invention.

FIG. 9 is a flowchart according to a fifth embodiment of the present invention, showing the case of new unit installation. The new unit is inserted in the working W or protection P slot, and a system reconfiguration command associated with the unit installation is entered from the terminal 10. The HMI control block 1 analyses the command, and the configuration setting judging section 28 searches the unit type table 27-2 in the management table 27 to retrieve the unit type of the working W slot (E1) and the unit type of the protection P slot (E2), and determines whether the unit type of one slot is different from that of the other slot (E3).

If the unit type is different, the system reconfiguration process is terminated to retain the unit type currently set. If the unit type is the same, the line type and line speed are determined from the unit type (E4), the management information in the management table (RAM) 27 is updated, and a control request for system reconfiguration is made to the main control block 2 (E5).

The main control block 2 updates the management information in the management table (RAM, EEPROM) 37 in accordance with the control request, containing the updated information, issued from the HMI control block 1, and loads the input/output section 35 (see FIG. 3) with the data for setting the system configuration redefined by the updated management information (E6). With this data, the system reconfiguration associated with the installation of the new unit is performed.

As described above, according to the present invention, when there occurs a change in the system configuration of the transmission apparatus, all that is needed is to enter a single system reconfiguration command from the terminal 10; thereupon, the HMI control block 1 judges the command and sends a system reconfiguration control request to the main control block 2, and the main control block 2 effects the system reconfiguration in accordance with the control request containing the updated management information. This offers the advantage of simplifying operator's operations and eliminating the possibility of operational errors when effecting system reconfiguration associated with the insertion, removal, etc. of a unit, as well as the advantage of being able to shorten the time required to start up the system after the system reconfiguration.

What is claimed is:

1. A system configuration setting method for a transmission apparatus that includes a main control block which sets system configuration by managing multiple units of multiple kinds and an HMI control block which receives a command from an external terminal and makes a control request to the main control block, the method comprising a step wherein:
   in response to a system configuration command from the terminal, the HMI control block determines, based on management information managed therein, whether system reconfiguration is needed or not, and if it is determined that the reconfiguration is needed, the HMI control block sends a control request to the main control block to change the system configuration so as to match an installed unit, whereupon the system reconfiguration is effected by the main control block; and
   wherein the HMI control block includes a management table to manage an installed configuration of the units and the main control block includes a management table to manage an installed configuration of the units, such that the installed information of the two management tables is controlled to coincide.

2. A system reconfiguration setting method according to claim 1, including a step where when the system reconfiguration command is entered from the terminal, the HMI control block judges the installation state of the unit based on the management information, to determine whether the unit is not installed, properly installed, or improperly installed and, based on the result of the result of the judgement of the installation state, determines whether the system reconfiguration is needed or not, and if it is determined that the reconfiguration is needed, the HMI control block sends the control request to the main control block, whereupon the system reconfiguration is effected by the main control block.

3. A system configuration setting method according to claim 1, including a step where when the system reconfiguration command is entered from the terminal, the HMI control block judges the unit type of the installed unit based on the management information, to determine whether the unit type is the same between a working unit and a protection unit, and only when the unit type is the same, the HMI control block determines that the system reconfiguration is needed, and sends the control request to the main control block to change he system configuration so as to match the installed unit, whereupon the system reconfiguration is effected by the main control block.

4. A system configuration setting method according to claim 1, including a step where when the system reconfiguration command is entered from the terminal, the HMI control block judges the versions of a working unit and a protection unit based on the management information, and performs control so that when one version is new and the other version is old, the system reconfiguration is effected according to the old version, and when both of the versions are either new or old and identical in version number, the system reconfiguration is effected according to either the new version or the old version.

5. A system configuration setting method according to claim 1, including a step where when the system reconfiguration command is entered from the terminal, the HMI control block judges an installation state of the unit based on the management information, and determines, based on the installation state, whether the reconfiguration is needed of not, and if it is determined that the reconfiguration is needed, the HMI control block performs control so that the system reconfiguration is effected to set the unit to a serviceable state if the unit is properly installed or to an out-of-service state in the unit is not properly installed.

6. A transmission apparatus comprising a main control block for accommodating and managing multiple units of multiple kinds and an HMI control block, connected to an external terminal, for transferring information to and from the main control block, wherein the HMI control block includes a management table constructed based on management information from the main control block, a management section which manages unit and line states, and a configuration setting judging section which, when activated by a system reconfiguration command from the terminal, refers to the management table of the HMI control block and determines whether system reconfiguration is needed or not and, if it is determined that the reconfiguration is needed, sends a control request to the main control block to change the system configuration so as to match an installed unit; and wherein the management table of the HMI control and a management table of the main control block each manage an installed configuration of the units, such that the installed information of the two management tables is controlled to coincide.

7. A transmission apparatus according to claim 6, wherein the HMI control block includes:

a unit installation state management section which manages unit installation states, a unit type management section which manages unit types, a unit version management section which manages unit versions, a unit service state management section which manages unit service states, a line service state management section which manages line service states, a line connection state management section which manages line speeds, a management table which stores management information managed by the respective management sections, and a configuration setting judging section which, in response to a system reconfiguration command from the terminal, refers to the management table and determines whether system reconfiguration is needed or not and, if it is determined that the reconfiguration is needed, sends a control request to the main control block to change the system configuration so as to match the installed unit.

* * * * *